Aug. 29, 1933.     A. M. HANSON     1,925,037

TIRE CHAIN

Filed Feb. 24, 1928

Inventor
Anton M. Hanson

By Howard Pusker
Attorney

Patented Aug. 29, 1933

1,925,037

UNITED STATES PATENT OFFICE 1,925,037

TIRE CHAIN

Anton M. Hanson, St. Paul, Minn., assignor of one-fourth to Katherine I. Connelly Application February 24, 1928. Serial No. 256,597

2 Claims. (Cl. 152—14)

My invention relates to tire chains and is particularly adapted to a form of holding means for the cross chains which is of a simple nature, yet having a practical design so formed as to hold the chains in the same relative position over the surface of the tread of the tire.

A feature of my invention resides in connecting together a series of arcuated plate-like members, the connection being such as to hold the members in position to extend in virtually a complete circle near the base of the tire and to form a stiff and comparatively non-flexing means of holding the cross chains in place over the tire. The advantage of a holder made up of a series of arcuated members having a stiff formation transversely of the members is that the cross chains are held in better position to operate to engage as a non-skid element and also to hold the parts of the cross chains when they break in wear from extending out sufficiently to strike the mud guard or body of the car in ordinary operation. Heretofore, a chain of a flexible nature has been used to hold the cross chains and when one of the cross links breaks, the holding chain will spread out and permit the broken portion to strike against the car, making a bad noise and also wearing away the enamel on the same.

It is also a feature of my invention to provide a flexible connecting means by the edge of the rigid arcuated members so as to hold the same in virtually circular shape when connected to a tire, and further to provide a particular means of connecting the attaching ends of the arcuated members to complete the holding member about the side of the tire by the series of arcuated stiff members.

The detail and particular features of my tire chains will be more fully and clearly set forth, together with other objects.

In the drawing forming part of my specification:

Figure 1:
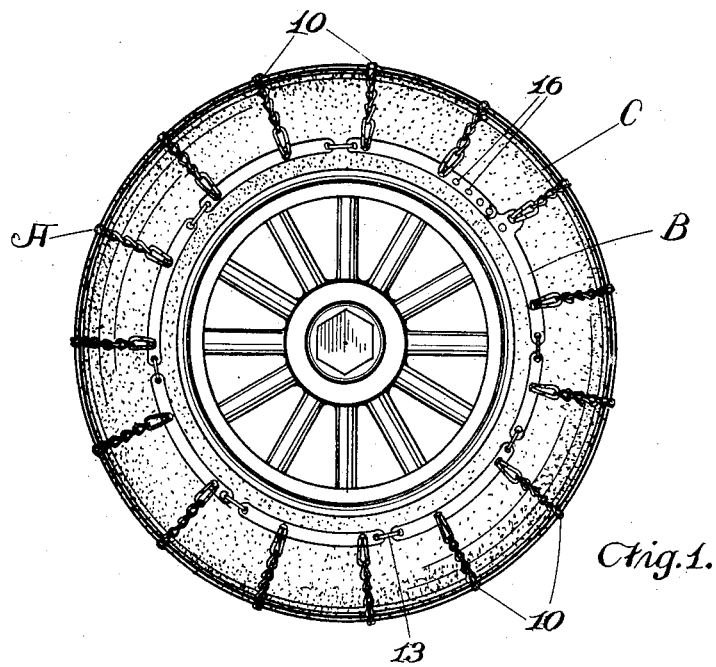
Figure 1 illustrates a side view of an automobile wheel showing my tire chains attached thereto.

In the drawing the tire chains A are formed with a series of cross chains 10 of the ordinary well known type and I provide a holding ring B made up of a series of arcuated members 12 which are connected on their ends by the links 13.

The holding ring B is the essential feature of my invention and the object is to provide a means adapted to hold the free ends of the cross chains 10 connected in such a manner as to prevent the same from flexing too freely. This provides a virtually rigid holding ring B wherein no extensive movement is given between the ends of the arcuated members 12 of the ring, thereby providing an anchoring means for the ends of the cross chains 10 of a more effective nature.

When the cross chains 10 are held in the manner I have set forth they are adapted to function in gripping the road more readily, and while they do not bind on the tire such as C, yet they are held firmly in operative position therewith so that when a grip is required of them they are held in place to function in a more effective manner. By this means the chains 10 do not snap off as easily as where they are held loose and free to permit the tire C to jerk the same under a grip with the road. After the chains have become worn slightly if they are not held snug across the tire tread they will break very easily with a snap. My ring B prevents this to a very large degree.

Figure 2:
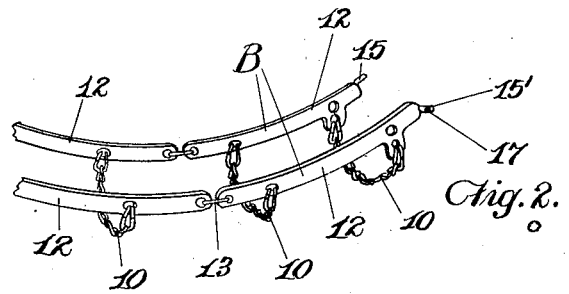
Figure 2 is a perspective of a portion of my tire chains illustrating the position of the parts.

The holding ring B which extends on either side of the tire C in the ordinary manner is provided with connecting ends, over one of which is formed with an outwardly projecting lug 15, while the other connecting member is formed with a series of openings 16 for receiving the lug 15. The series of openings 16 permit the adjustment of the ends of the member B to properly adjust the same so as to be drawn taut. Where the lug 15 projects as an integral rigid part from the ends of one of the members 12, it is necessary to hold the other connecting end carrying the opening 16 at a proper angle to extend over the projecting and bent lug 15, so as to permit the parts to be interconnected together at the proper adjustment. The lug 15' as illustrated in Figure 2 on the outer member 12 of the ring B extends out in the form of a bolt and is provided with an opening 17 through which a wire or locking member may be extended to lock the lug 15' in the hole 16 at the proper adjustment, as illustrated in Figure 1.

Figure 3:
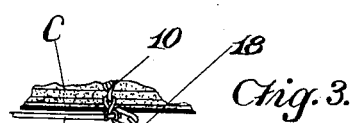
Figure 3 is a detail of a portion of my tire chains.
Figure 4:
Figure 4 is another detail of a portion of my tire chains.
Figure 5:
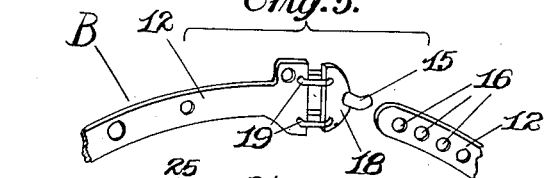
Figure 5 is a detail illustrating the two ends for connecting the members of my tire chain together.
Figure 6:
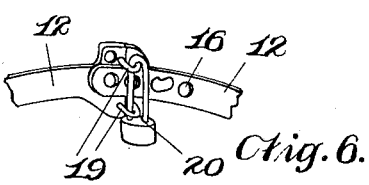
Figure 6 illustrates the ends shown in the detail of Figure 5, connected together and locked in position.

The connecting ends of the members 12 may be formed as illustrated in Figures 5 and 6. In this construction one of the members 12 is provided with a plate 18 which carries the bent lug 15 and this plate is connected by the links 19 flexibly to the body of the member 12. The adjacent end of the other members 12 which is adapted to connect with the lug 15 is formed with the openings 16 so as to adjustably connect the plate 18 and the lug 15 with the perforated end of the member 12. This form of connection may be used on the outer ring B while the rigid form of lug 15 with the holes 16 may be used on the inner ring. Thus the inner ring B can be connected at the proper adjustment first, and then the outer connection can be made easily by the flexibly connecting plate 18 which permits the lug 15 to be extended through the openings 16, as illustrated in Figures 3 and 4. The plate 18 after it is connected with the adjacent end of the member 12 may be drawn close to the end of the member 12 supporting the same and the two members 12 locked together by passing the loop of a lock 20 through the projecting ends of the links 19 as illustrated in Figure 6. In this manner the tire chains A may be locked to the tire C.

Figure 7:
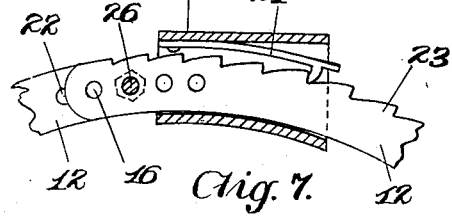
Figure 7 is a detail partly in section of an enlarged illustration of another form of connecting the ends of my tire chain holding means.

I have also illustrated in Figure 7 an adjustable form of ends for the members 12. In this form one of the members 12 is provided with a series of holes 22, while the other member is formed with the holes 16 and is also formed with teeth 23. The teeth 23 are adapted to engage with the pawl 24 which is carried in the socket portion 25 which is formed on the end of one of the members 12, and which is adapted to receive the end of the member 12 formed with the teeth 23. This permits the ends of the ring B to be drawn up to the proper adjustment and when the same is tight enough, then a bolt 26 may be run through the openings 16 and the openings 22 to lock the connecting ends of the members 12 rigidly together. I have illustrated this form of ratchet locking means to merely show a practical means of connecting the rigid links 12 together at their ends if it is desired to do it in this manner. Any such form of ratchet connecting means is adaptable to the connecting ends of my rings B.

My tire chains operate in a very practical manner to hold cross chains of any suitable nature firmly in place. These cross chains may be rubber or metal chains and owing to the fact that the cross chains break from time to time as they wear out, and further, for the reason that it is seldom that these chains all break, one after the other, the importance of the construction of my rigid link members 12 may be more fully anticipated. These links form virtually a ring of a stationary nature flexing only sufficiently between the same to permit the proper adjustment about the tire and movement over the tire surface to permit the cross chains to change position on the tread of the tire, but holding the ends of the cross chain in a position so that they will operate more effectively, and if they do break, the broken ends will not reach up to strike the car or the parts thereof. Therefore I provide a very practical and effective tire chain for automobile wheels.

In accordance with the patent statutes I have described the principles of operation of my tire chain and while I have set forth and endeavored to describe a particular formation and design of tire chains, yet I desire to have it understood that the same is only illustrative of a means of carrying out my invention and that the same may be changed and applied to uses other than those above set forth within the scope of the following claims without departing from the purpose and intent of the invention.

I claim:

1. A tire chain including two series of narrow arcuate flat bars, loop links for loosely linking said bars to one another, a series of cross chains connecting one of said series of bars to the other series and manually disconnectable means in each series of bars.

2. A tire chain including two series of arcuated elongated narrow rod members, chain links engaging holes in said members for loosely connecting each of said rod members to each other to form a pair of side rings, each of said rod members being less than one-quarter of the circumference of the rings, cross chains extending between and secured to said arcuate rod members and manually operated means for adjustably joining the ends of a pair of said members to each other in each series.

ANTON M. HANSON.